(12) United States Patent
Shinohara et al.

(10) Patent No.: US 10,754,084 B2
(45) Date of Patent: Aug. 25, 2020

(54) LIGHT SOURCE DEVICE, LIGHTGUIDE ELEMENT, AND SURFACE ILLUMINATION DEVICE

(71) Applicant: OMRON Corporation, Kyoto-shi, Kyoto (JP)

(72) Inventors: Masayuki Shinohara, Nagaokakyo (JP); Yuto Mori, Joyo (JP); Norikazu Kitamura, Osaka (JP); Yasuhiro Tanoue, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 245 days.

(21) Appl. No.: 15/440,216

(22) Filed: Feb. 23, 2017

(65) Prior Publication Data

US 2017/0293070 A1    Oct. 12, 2017

(30) Foreign Application Priority Data

Apr. 7, 2016   (JP) .................................. 2016-077351

(51) Int. Cl.
*F21V 8/00*   (2006.01)

(52) U.S. Cl.
CPC ......... *G02B 6/0055* (2013.01); *G02B 6/0023* (2013.01); *G02B 6/0028* (2013.01);
(Continued)

(58) Field of Classification Search
CPC .. G02B 6/0016; G02B 6/0023; G02B 6/0028; G02B 6/0046; G02B 6/0053; G02B 6/0055; G02B 6/0078
(Continued)

(56) References Cited

U.S. PATENT DOCUMENTS 5,808,708 A * 9/1998 Oyama ................ G02B 6/0018
                                                    349/62
8,016,473 B2 * 9/2011 Salters ................ G02B 6/0076
                                                    362/23.17
(Continued)

FOREIGN PATENT DOCUMENTS

JP    2005-086391 A    3/2005
JP    2013-218826 A    10/2013
(Continued)

OTHER PUBLICATIONS

Machine Translation from espacenet of Tsujimoto (JP 2013218826) (Year: 2013).*
(Continued)

*Primary Examiner* — Leah Simone Macchiarolo
(74) *Attorney, Agent, or Firm* — Metrolex IP Law Group, PLLC

(57) ABSTRACT

A light source device includes a light source configured to emit illumination light and a flat plate shaped transparent lightguide element. The lightguide element includes: an incident surface facing the light source; a reflecting surface formed in one of side surfaces of the lightguide element to reflect the illumination light incident into the lightguide element from the incident surface; and an exit surface formed in a side surface of the lightguide element on an opposite side to the reflecting surface, the illumination light reflected by the reflecting surface exiting from the exit surface. The reflecting surface is formed into a curved surface, the curved surface collimating the illumination light reflected by the reflecting surface in a surface including a lengthwise direction of the reflecting surface, and the reflecting surface is formed into a concave mirror in a surface including a short direction of the reflecting surface.

11 Claims, 13 Drawing Sheets

(52) U.S. Cl.
CPC ......... *G02B 6/0031* (2013.01); *G02B 6/0046* (2013.01); *G02B 6/0053* (2013.01); *G02B 6/0078* (2013.01)

(58) Field of Classification Search
USPC ........................................................ 362/610
See application file for complete search history.

(56) References Cited

U.S. PATENT DOCUMENTS

| | | | | |
|---|---|---|---|---|
| 2005/0201120 A1* | 9/2005 | Nesterenko | .......... | G02B 6/0028 362/609 |
| 2009/0103283 A1* | 4/2009 | Baba | ...................... | G02B 6/002 362/97.2 |
| 2009/0201698 A1* | 8/2009 | Klick | .................. | G02B 6/0018 362/555 |
| 2009/0290328 A1* | 11/2009 | Ueyama | ............... | G02B 6/0028 362/97.3 |
| 2009/0303417 A1* | 12/2009 | Mizushima | .......... | G02B 3/0056 349/65 |
| 2013/0201721 A1* | 8/2013 | Tsai | ..................... | G02B 6/0036 362/609 |
| 2014/0185320 A1* | 7/2014 | Wang He | ............. | G02B 6/0028 362/610 |

FOREIGN PATENT DOCUMENTS

| | | |
|---|---|---|
| JP | 2015-038813 A | 2/2015 |
| WO | 2008/140106 A1 | 11/2008 |

OTHER PUBLICATIONS

Japanese Office Action (JPOA) dated Oct. 29, 2019 in a counterpart Japanese patent application.

* cited by examiner

LIGHT SOURCE DEVICE, LIGHTGUIDE ELEMENT, AND SURFACE ILLUMINATION DEVICE

CROSS-REFERENCE TO RELATED APPLICATION

This application is based on Japanese Patent Application No. 2016-077351 filed with the Japan Patent Office on Apr. 7, 2016, the entire contents of which are incorporated herein by reference.

FIELD

The disclosure relates to a light source device including a light source and a lightguide element that guides light emitted from the light source, a lightguide element used in the light source device, and a surface illumination device including the light source device.

BACKGROUND

Conventionally, the light source device including the light source and the lightguide element that guides the light emitted from the light source is proposed in order to improve use efficiency of the light emitted from the light source (for example, see JP-A-2013-218826).

For example, the light source device disclosed in JP-A-2013-218826 includes a light source, a first concave mirror that reflects the light emitted in a first direction, and a second concave mirror that reflects the light emitted in a second direction. The first concave mirror is formed into a curved shape having a focal point in section, a position where the light source emits the light in the first direction is substantially matched with the focal point, the light emitted in the first direction is reflected by the first concave mirror to exit to the outside, and the light emitted in the second direction is reflected by the second concave mirror, and is reflected by the first concave mirror to exit to the outside. The first and second concave mirrors are formed as a cylindrical surface.

However, in the light source device disclosed in JP-A-2013-218826, because the two concave mirrors are formed as the cylindrical surface, each concave mirror has power only in one direction, but does not have power in a direction orthogonal to the direction in which the concave mirror has the power. In a total of light emitted from the light source, for light perpendicularly incident on the concave mirror in the direction in which the concave mirror does not have the power, because the position of the light does not change in the direction even if the light is reflected by the concave mirror, only the light is reflected between the two concave mirrors, but the light does not exit from the light source device. Therefore, the light becomes a loss. Therefore, there is a demand for the light source device having the higher light use efficiency.

SUMMARY

An object of an embodiment of the disclosure is to provide a light source device that can improve the light use efficiency.

One aspect of the present invention provides a light source device. The light source device includes a light source configured to emit illumination light and a lightguide element formed into a flat plate shape using a transparent material. The lightguide element includes: an incident surface facing the light source, the incident surface being formed so as to cause the illumination light emitted from the light source to be incident into the lightguide element; a reflecting surface formed in one of side surfaces of the lightguide element to reflect the illumination light incident into the lightguide element; and an exit surface formed in a side surface of the lightguide element on an opposite side to the reflecting surface, the illumination light reflected by the reflecting surface exiting from the exit surface. The reflecting surface is formed into a curved surface, the curved surface collimating the illumination light reflected by the reflecting surface in a surface including a lengthwise direction of the reflecting surface, and the reflecting surface is formed into a concave mirror in a surface including a short direction of the reflecting surface.

In the light source device, it may be preferred that the incident surface and the exit surface of the lightguide element are integrally formed, the reflecting surface is formed into an elliptic shape along the short direction of the reflecting surface, and the light source is disposed at one of focal points in the short direction of the reflecting surface.

In the light source device, it may be preferred that the reflecting surface of the lightguide element is formed into a parabolic shape along the short direction of the reflecting surface, and is formed such that a vertex of the reflecting surface in the short direction deviates from a center of the lightguide element in the short direction, the incident surface and the exit surface of the lightguide element are integrally formed, and a distance from the vertex of the reflecting surface to the incident surface becomes a focal distance of the reflecting surface in the short direction, and the light source is disposed at a position deviating from the center of the lightguide element onto an opposite side to the vertex in the short direction.

It may be preferred that the light source device further includes a mask plate disposed between the incident surface and the light source of the lightguide element, the mask plate made of an opaque material being shorter than the lightguide element in the short direction. At this point, the mask plate includes a slit extending in the short direction at a position facing the light source.

In the light source device, the incident surface is formed at a position closer to the exit surface than the reflecting surface in a depth direction from the reflecting surface toward the exit surface in a first surface formed in lengthwise directions of the reflecting surface and the exit surface of the lightguide element, and the lightguide element further includes a prism formed opposite to the incident surface in a second surface to reflect the illumination light incident into the lightguide element through the incident surface toward the reflecting surface.

In the light source device, it may be preferred that the prism is formed at a focal point of the reflecting surface in the lengthwise direction.

In the light source device, it may be preferred that the lightguide element further includes a retroreflection sheet configured to retroreflect the illumination light incident from the first surface in which the incident surface is provided, the retroreflection sheet being provided on both sides of the prism in the lengthwise direction in the second surface.

In the light source device, it may be preferred that the lightguide element is formed into a wedge shape in which a length in the short direction increases toward the reflecting surface.

In the light source device, it may be preferred that the lightguide element includes a notch formed in the lengthwise direction on one side of the exit surface in the short direction and a rectangular solid lightguide member attached to the notch. In this case, it may be preferred that one of end faces of the lightguide member in the lengthwise direction is formed as the incident surface, and a prism is formed in a surface on an opposite side to a surface facing the notch of the lightguide member, the prism reflecting the illumination light incident into the lightguide member through the incident surface toward the reflecting surface.

Another aspect of the present invention provides a surface illumination device. The surface illumination device includes: a light source device configured to emit illumination light; and a lightguide plate configured to cause the illumination light incident into the lightguide plate to exit from one of surfaces, the lightguide plate being formed into a flat plate shape using a transparent material. The light source device includes: a light source configured to emit the illumination light; and a lightguide element formed into a flat plate shape using a transparent material, the lightguide element includes: an incident surface facing the light source, the incident surface being formed so as to cause the illumination light to be incident into the lightguide element; a reflecting surface formed in one of side surfaces of the lightguide element to reflect the illumination light incident into the lightguide element; and an exit surface formed in a side surface of the lightguide element on an opposite side to the reflecting surface, the illumination light reflected by the reflecting surface exiting from the exit surface, the reflecting surface is formed into a curved surface, the curved surface collimating the illumination light reflected by the reflecting surface in a surface including a lengthwise direction of the reflecting surface, and the reflecting surface is formed into a concave mirror in a surface including a short direction of the reflecting surface. The lightguide plate includes: an incident surface disposed opposite to the exit surface of the lightguide element; and plural prisms formed in the second surface of the lightguide plate to reflect the illumination light propagated in the lightguide plate toward the first surface.

Still another aspect of the present invention provides a lightguide element formed into a flat plate shape using a transparent material. The lightguide element includes: an incident surface facing the light source configured to emit illumination light, the incident surface being formed so as to cause the illumination light to be incident into the lightguide element; a reflecting surface formed in one of side surfaces of the lightguide element to reflect the illumination light incident into the lightguide element; and an exit surface formed in a side surface of the lightguide element on an opposite side to the reflecting surface, the illumination light reflected by the reflecting surface exiting from the exit surface. At this point, the reflecting surface is formed into a curved surface, the curved surface collimating the illumination light reflected by the reflecting surface in a surface including a lengthwise direction of the reflecting surface, and the reflecting surface is formed into a concave mirror in a surface including a short direction of the reflecting surface.

According to the above aspect(s), the light source device can improve the light use efficiency.

DETAILED DESCRIPTION

Hereinafter, a light source device according to an embodiment of the present invention will be described with reference to the drawings. The light source device of the embodiment includes a light source and a lightguide element, which collects light emitted from the light source and causes the light to exit in a predetermined direction. The lightguide element is formed into a flat-plate shape. One of side surfaces of the lightguide element faces the light source to constitute an incident and exiting surface. The light emitted from the light source is incident on the lightguide element through the incident and exiting surface, and the light propagated in the lightguide element exits from the incident and exiting surface. On the other hand, a side surface opposite to the incident and exiting surface of the lightguide element constitutes a reflecting surface, which is formed into a curved surface such that concave mirrors are formed in both a lengthwise direction of the incident and exiting surface and a short direction of the incident and exiting surface. Therefore, in the light source device, an amount of light exiting from the incident and exiting surface in the total of light emitted from the light source increases in both the lengthwise direction of the incident and exiting surface and the short direction of the incident and exiting surface, which allows the improvement of the light use efficiency.

Hereinafter, for convenience of description, the short directions of the incident and exiting surface and the reflecting surface of the lightguide element are referred to as a thickness direction, and the lengthwise directions of the incident and exiting surface and the reflecting surface of the lightguide element are referred to as a width direction. A direction, which is from the incident and exiting surface toward the reflecting surface while being orthogonal to the thickness direction and the width direction, is referred to as a depth direction. A length in the thickness direction is referred to as a thickness, a length in the width direction is referred to as a width, and a length in the depth direction is referred to as a depth.

Figure 1:
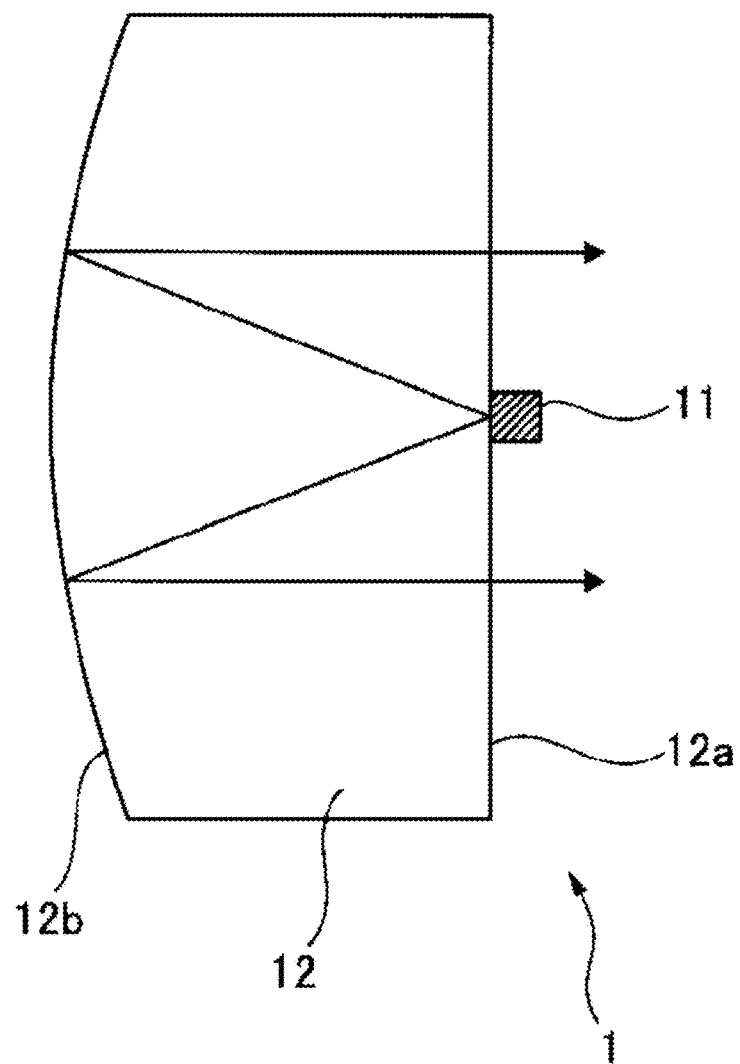
FIG. 1 is a schematic plan view illustrating a light source device according to an embodiment of the present invention.
Figure 2:
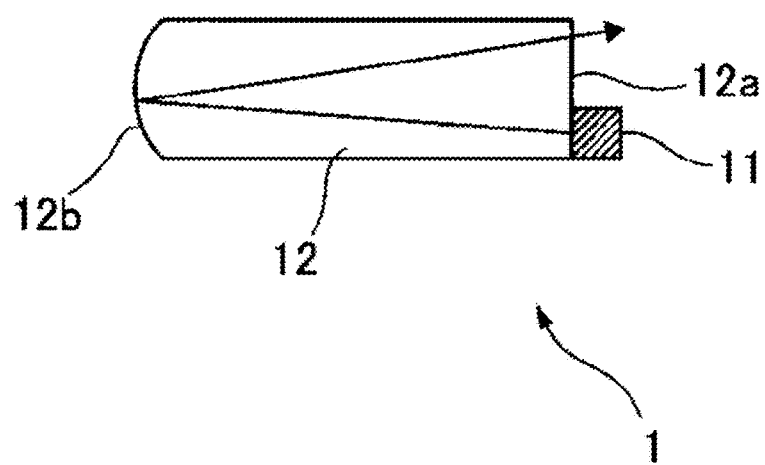
FIG. 2 is a side view illustrating a schematic configuration of the light source device.

FIG. 1 is a schematic plan view illustrating the light source device of the embodiment. FIG. 2 is a side view illustrating a schematic configuration of the light source device. A light source device 1 includes a light source 11 and a lightguide element 12.

The light source 11 includes one or plural light emitting elements that emit diffusing illumination light and a drive circuit. For example, a light emitting diode, a laser diode, or an organic EL light emitting element, which emits white light or light having a predetermined wavelength, can be used as a light emitting element included in the light source 11. The light source 11 is turned on to emit illumination light while receiving a lighting instruction signal from a control circuit (not illustrated). Hereinafter, the illumination light emitted from the light source 11 is simply referred to as light.

The lightguide element 12 is formed into a flat plate by molding a material transparent to the light emitted from the light source 11, namely, a transparent resin such as polymethylmethacrylate (PMMA), polycarbonate, and cycloolefin polymer. One of side surfaces of the lightguide element 12 faces the light source 11 to constitute an incident and exiting surface 12a. The light emitted from the light source 11 is incident on the lightguide element 12 through the incident and exiting surface 12a, and the light propagated in the lightguide element 12 exits from the incident and exiting surface 12a. For example, the incident and exiting surface 12a is formed into a flat plate shape. On the other hand, the side surface opposite to the incident and exiting surface 12a is formed as a reflecting surface 12b that reflects the light propagated in the lightguide element 12. An evaporated film made of metal or a multi-layered reflecting film made of plural materials having different refractive indexes may be formed on the reflecting surface 12b so as to be able to reflect the light incident on the reflecting surface 12b with an incident angle smaller than a critical angle of total reflection.

In the embodiment, the light source 11 is disposed so as to be located in the substantial center of the incident and exiting surface 12a in the width direction, and is disposed such that the emission surface of the light emitting element of the light source 11 faces the incident and exiting surface 12a on one end side of the incident and exiting surface 12a in the thickness direction. Therefore, almost the light emitted from the light source 11 is incident on the lightguide element 12 through the incident and exiting surface 12a.

The reflecting surface 12b is formed so as to become a concave mirror in both the width direction and the thickness direction. At this point, in the surface including the width direction, a curvature of the reflecting surface 12b is set such that the light source 11 is substantially matched with the focal point of the reflecting surface 12b. The reflecting surface 12b is formed such that a curvature radius R of the reflecting surface 12b in the width direction is double the depth of the lightguide element 12. In the width direction, the light emitted from the light source 11 is reflected by the reflecting surface 12b, and therefore the light becomes substantially collimated light along the depth direction. The reflecting surface 12b may be formed into a parabolic shape in which the position of the light source 11 becomes the focal point in the surface including the width direction. Therefore, parallelism of the light, which is emitted from the light source 11 and reflected by the reflecting surface 12b, is improved in the surface including the width direction.

In the thickness direction, the reflecting surface 12b is set such that an optical path length of the light, which is reflected by the reflecting surface 12b to reach the incident and exiting surface 12a again after the light emitted from the light source 11 is incident on the incident and exiting surface 12a, is kept constant irrespective of the position of the reflecting surface 12b, namely, the reflecting surface 12b is formed into an elliptic shape.

Figure 3:
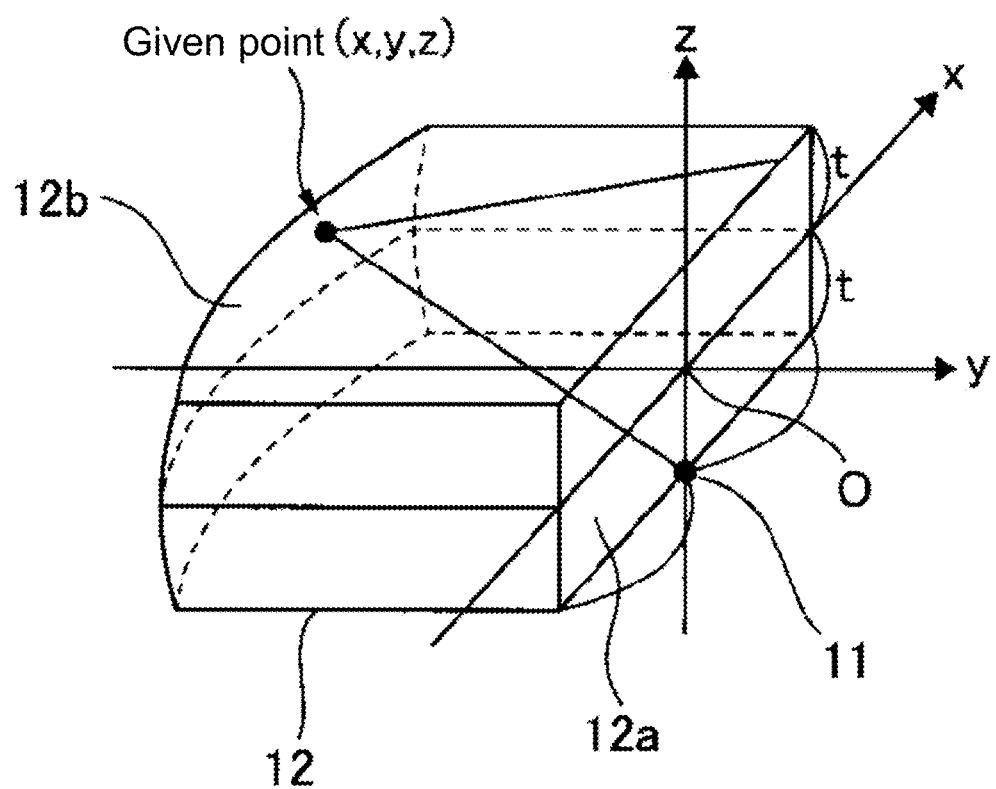
FIG. 3 is a view illustrating an example of a path of light emitted from a light source.

FIG. 3 is a view illustrating an example of a path of the light emitted from the light source 11. As illustrated in FIG. 3, for convenience, an origin O is set to a center of the incident and exiting surface 12a in the width direction and thickness direction. The width direction is set to an x-axis, the depth direction is set to a y-axis, and the thickness direction is set to a z-axis. It is assumed that 2t is the thickness of the lightguide element 12, and that f is the depth of the lightguide element 12, namely, the focal distance of the reflecting surface 12b in the width direction. It is assumed that (0,0,−t) is a coordinate of the position where the light emitted from the light source 11 is incident on the lightguide element 12. In this case, the following equations hold with respect to the optical path length of the light reflected at a given point (x,y,z) on the reflecting surface 12b.

[Mathematical formula 1]

$$\sqrt{x^2 + y^2 + (z+t)^2} + \sqrt{y^2 + (t-z)^2} = 2\sqrt{f^2 + t^2} \quad (1)$$

$$y = \sqrt{\left(\frac{x^2 + 4tz - 4C^2}{4C}\right)^2 - (t-z)^2}$$

$$C = \sqrt{f^2 + t^2}$$

When the curvature of the reflecting surface 12b is set as described above, the reflecting surface 12b becomes the ellipse in the thickness direction. Therefore, the light use efficiency is improved because the light reflected by the reflecting surface 12b is focused on the incident and exiting surface.

Preferably the light source 11 includes plural light emitting elements arrayed in the width direction in order to reduce unevenness of an illuminance distribution of the light exiting from the incident and exiting surface 12a. For example, it is assumed that the thickness 2t of the lightguide element 12 is 31 mm, that the focal distance f in the width direction is 25 mm, and that the light emitted from the light emitting element of the light source 11 follows a Lambert distribution. In this case, for example, preferably the plural light emitting elements of the light source 11 are arrayed in the width direction with a pitch of 30 mm to 40 mm in order that a ratio (Lmin/Lmax) of a maximum illuminance Lmax and a minimum illuminance Lmin is greater than or equal to ½ in the illuminance distribution of the light emitted from the incident and exiting surface 12a.

As expressed by the equations (1), in the case that the reflecting surface 12b is formed into the elliptic shape in the thickness direction, preferably the light source 11 is disposed so as to be substantially matched with one of focal points of the ellipse in the thickness direction. In this case, the light emitted from the light source 11 is reflected by the reflecting surface 12b and focused on the other focal point in the vicinity of the incident and exiting surface 12a in the thickness direction. Accordingly, the light returning to the light source 11 can substantially be eliminated. A device in which the light from the light source device 1 is used, for example, a lightguide plate for an illumination device is disposed at the other focal point, which allows the efficient use of the light from the light source device 1.

Figure 4A:
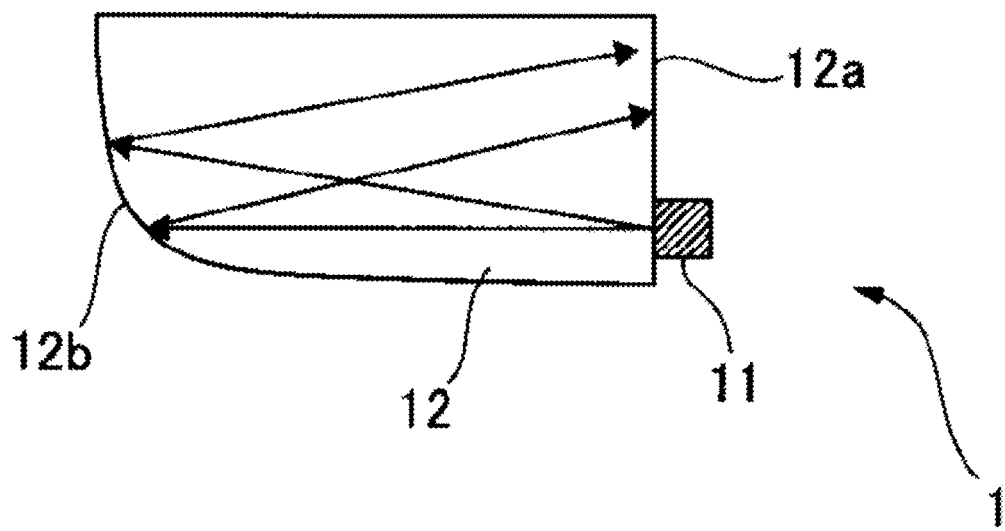
FIGS. 4A and 4B are schematic side views illustrating light source devices according to first and second modifications.
Figure 4B:
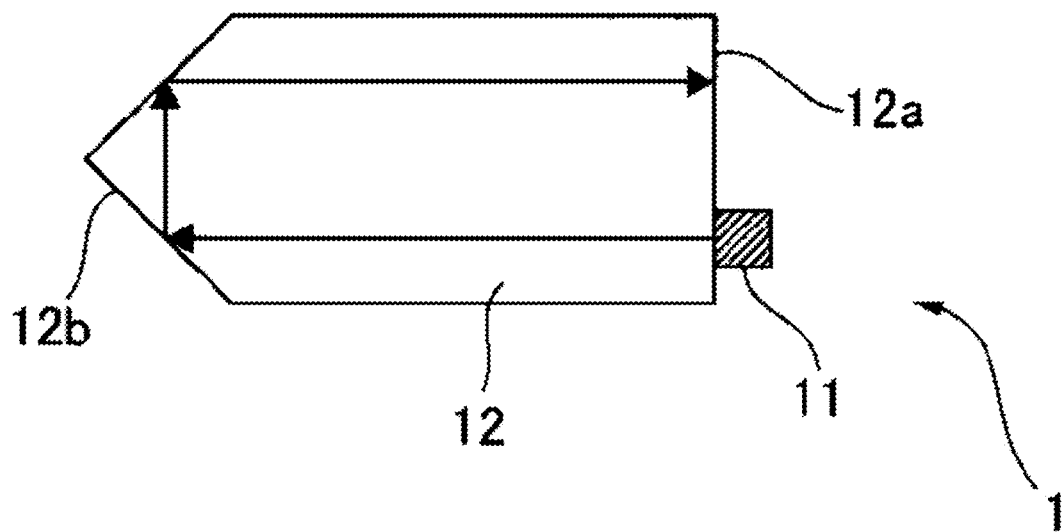

FIGS. 4A and 4B are schematic side views illustrating light source devices 1 according to first and second modifications. In the first modification of FIG. 4A, the reflecting surface 12b of the lightguide element 12 is formed into the parabolic shape in the thickness direction, and the focal point of the reflecting surface 12b is located on the incident and exiting surface 12a. The light source 11 is disposed at a position deviating from the focal point of the reflecting surface 12b in the thickness direction. In the first modification of FIG. 4A, the reflecting surface 12b is formed such that the focal point and a vertex of the reflecting surface 12b are located in the vicinity of an upper end of the incident and exiting surface 12a, and the light source 11 is located in the vicinity of a lower end of the incident and exiting surface 12a. In this case, the light, which is emitted from the light source 11 to be incident into the lightguide element 12 through the incident and exiting surface 12a, is reflected by the reflecting surface 12b to become the collimated light in the thickness direction. However, because the light source 11 deviates from the focal position, the light reflected by the reflecting surface 12b travels in a direction oblique to the depth direction. Therefore, the light that is reflected by the reflecting surface 12b to return to the light source 11 can substantially be eliminated.

Preferably a deviation amount of the light source 11 from the focal position is set such that the angle of the light reflected by the reflecting surface 12b to a top surface or a bottom surface of the lightguide element 12 is included in an angle range of the total reflection.

In the second modification of FIG. 4B, the reflecting surface 12b of the lightguide element 12 is formed into a corner-cube shape in the thickness direction, and the light source 11 is disposed so as to deviate upward or downward from the vertex of the corner cube. In this case, the light, which is emitted from the light source 11 to be incident into the lightguide element 12 through the incident and exiting surface 12a, is retroreflected by the reflecting surface 12b in the thickness direction. The light, which is reflected by the reflecting surface 12b to return to the light source 11, can substantially be eliminated because the position where the retroreflected light reaches the incident and exiting surface 12a is different from the light source 11.

Figure 5A:
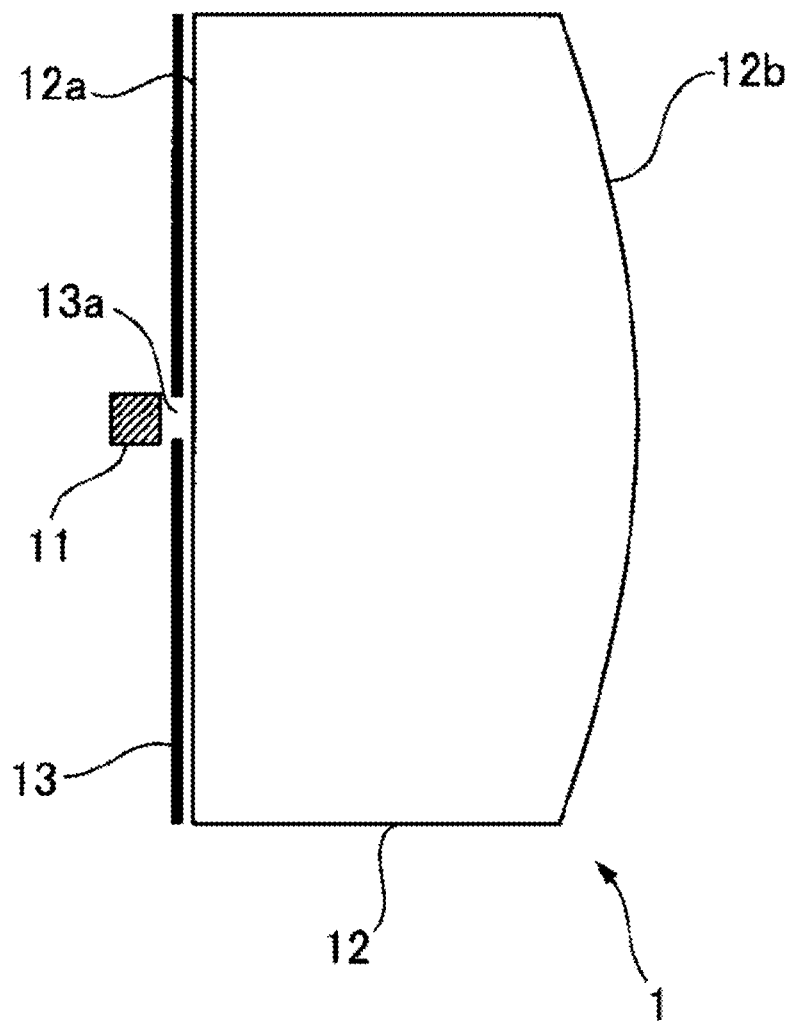
FIG. 5A is a schematic plan view illustrating a light source device according to a third modification.
Figure 5B:
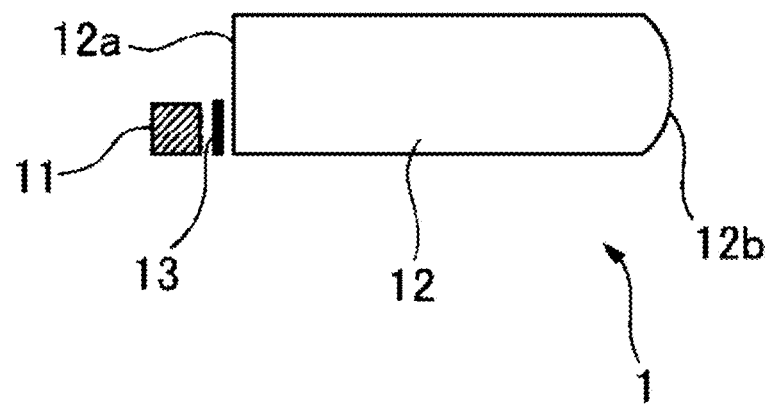
FIG. 5B is a schematic side view illustrating the light source device of the third modification.

FIG. 5A is a schematic plan view illustrating a light source device 1 according to a third modification, and FIG. 5B is a schematic side view illustrating the light source device 1 of the third modification. In the third modification, a mask plate 13 made of an opaque material is disposed between the incident and exiting surface 12a of the lightguide element 12 and the light source 11. In the mask plate 13, a slit 13a extending along the thickness direction is formed in the vicinity of a focal point of the reflecting surface 12b in the width direction. The light emitted from the light source 11 is incident from the incident and exiting surface 12a into the lightguide element 12 through the slit 13a. At this point, preferably a width D of the slit 13a is smaller than a width of an emission surface of the light source 11. The light within a range narrower than the emission surface of the light emitting element of the light source 11 is incident on the lightguide element 12 in the width direction. Therefore, the parallelism of the light is further improved after the light is reflected by the reflecting surface 12b.

The mask plate 13 is set such that the length of the mask plate 13 in the thickness direction is greater than or equal to the length of the light source 11 in the thickness direction, and is set such that the length of the mask plate 13 in the thickness direction is less than the thickness of the lightguide element 12. For example, the mask plate 13 is set so as to be less than ½ of the thickness of the lightguide element 12. Therefore, the mask plate 13 is prevented from blocking the light incident into the lightguide element 12 when the light exits from the incident and exiting surface 12a.

Figure 6:
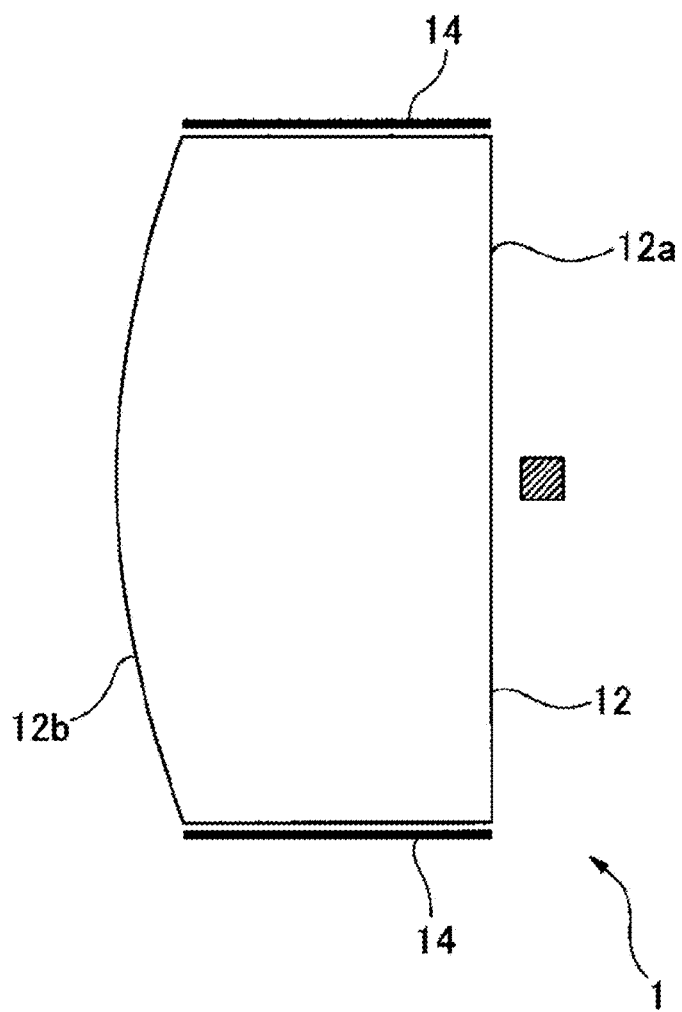
FIG. 6 is a schematic plan view illustrating a light source device according to a fourth modification.

FIG. 6 is a schematic plan view illustrating a light source device 1 according to a fourth modification. In the fourth modification, a light absorbing member 14 having a light absorbing property is provided in both side surfaces (hereinafter, simply referred to as a side surface) except for the incident and exiting surface 12a and reflecting surface 12b of the lightguide element 12. For example, the light absorbing member 14 is formed of pigments or a light absorbing resin.

In the fourth modification, the light absorbing member 14 absorbs the light reaching one of the side surfaces in the light propagated in the lightguide element 12. Therefore, parallelism of the light exiting from the lightguide element 12 is further improved in the width direction.

Figure 7:
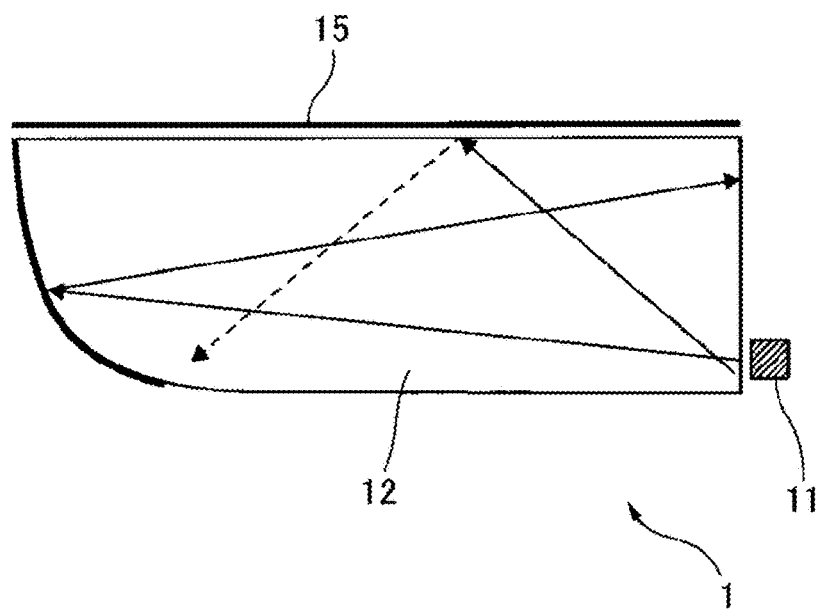
FIG. 7 is a schematic side view illustrating a light source device according to a fifth modification.

FIG. 7 is a schematic side view illustrating a light source device 1 according to a fifth modification. In the fifth modification, a light absorbing member 15 having a light absorbing property is provided in the top surface of the lightguide element 12 on the opposite side to the light source 11 in the thickness direction. For example, the light absorbing member 15 is formed of pigments or a light absorbing resin. In the fifth modification of FIG. 7, because the light source 11 is disposed below the center of the lightguide element 12 in the thickness direction, the light absorbing member 15 is provided in the top surface of the lightguide element 12. In the following description, the light absorbing member 15 is provided in the top surface of the lightguide element 12. However, the light absorbing member 15 may be provided in the bottom surface of the lightguide element 12.

In the fifth modification, the light absorbing member 15 absorbs the light reaching the top surface in the light propagated in the lightguide element 12. The parallelism of the light exiting from the lightguide element 12 is further improved in the thickness direction, and therefore directivity of the light exiting from the lightguide element 12 is improved in the thickness direction.

Figure 8:
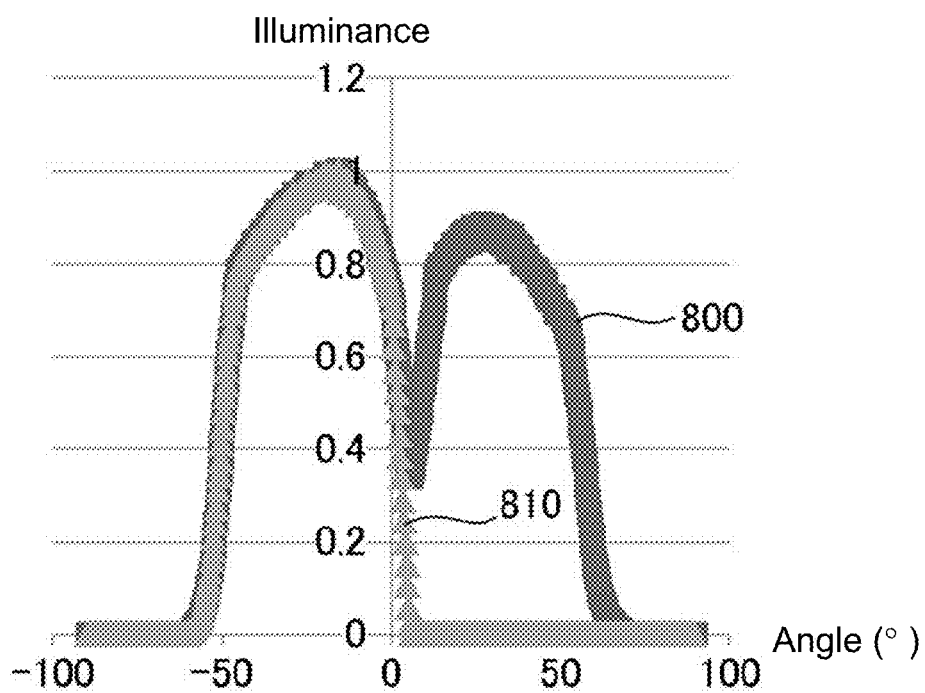
FIG. 8 illustrates a simulation result example of directivity of light exiting from a lightguide element when a light absorbing member is provided and directivity of the light exiting from the lightguide element when the light absorbing member is not provided.

FIG. 8 illustrates a simulation result example of the directivity of the light exiting from the lightguide element 12 when the light absorbing member 15 is provided and the directivity of the light exiting from the lightguide element 12 when the light absorbing member 15 is not provided. In FIG. 8, a horizontal axis indicates an angle with respect to the thickness direction, and a vertical axis indicates a value in which illuminance of the light exiting from the lightguide element 12 is normalized by a maximum value of the illuminance. A pattern 800 indicates a radiation pattern of the light exiting from the lightguide element 12 when the light absorbing member 15 is not provided, and a pattern 810 indicates a radiation pattern of the light exiting from the lightguide element 12 when the light absorbing member 15 is provided. As can be seen from the patterns 800 and 810, compared with the case that the light absorbing member 15 is not provided, the directivity of the exiting light is improved when the light absorbing member 15 is provided.

Figure 9:
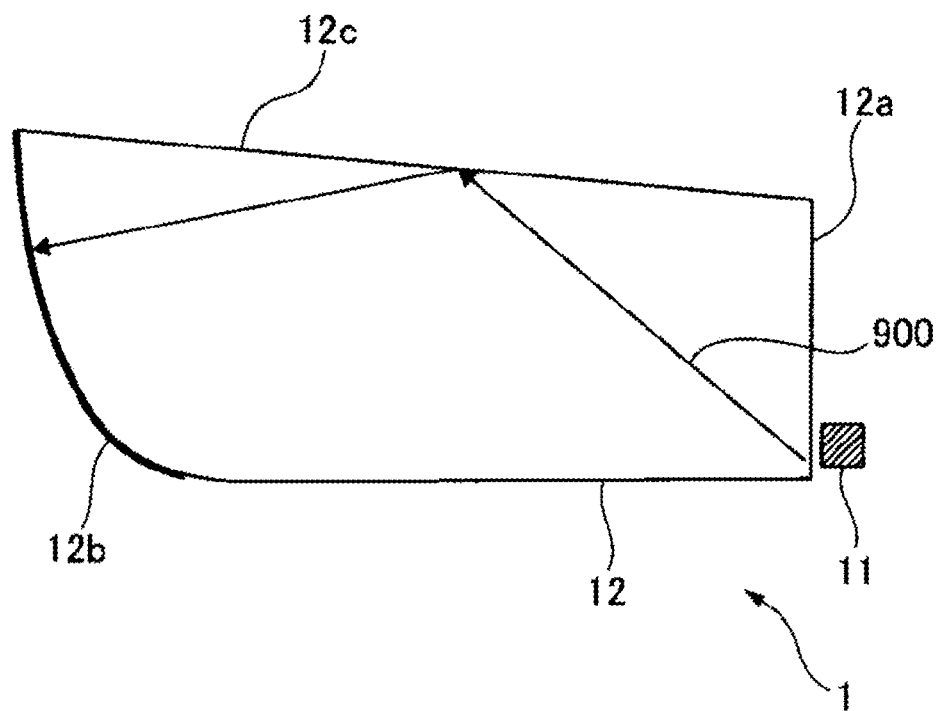
FIG. 9 is a schematic side views illustrating a light source device according to a sixth modification.

FIG. 9 is a schematic side views illustrating a light source device 1 according to a sixth modification. In the sixth modification, the lightguide element 12 is formed into a wedge shape such that the thickness of the lightguide element 12 increases as the lightguide element 12 separates from the incident and exiting surface 12a in the thickness direction, namely, as the lightguide element 12 comes close to the reflecting surface 12b in the thickness direction. Particularly, the surface of the lightguide element 12 on the opposite side to the light source 11 is preferably formed so as to separate from the light source 11 in the thickness direction with increasing distance between the surface and the incident and exiting surface 12a. In the sixth modification of FIG. 9, because the light source 11 is disposed below the center of the lightguide element 12 in the thickness direction, the surface of the lightguide element 12 is formed upward as a top surface 12c of the lightguide element 12 separates from the incident and exiting surface 12a, namely, the top surface 12c comes close to the reflecting surface 12b.

An angle formed between the top surface 12c and the light, which is emitted from the light source 11 and travels toward the top surface 12c after being incident into the lightguide element 12 through the incident and exiting surface 12a, decreases as indicated by an arrow 900. Therefore, an amount of light totally reflected by the top surface 12c increases. Resultantly, stray light exiting from the top surface 12c to the outside of the lightguide element 12 can be decreased in the light source device 1. In the light source device 1 of the sixth modification, the directivity of the light exiting from the lightguide element 12 can further be improved in the thickness direction.

In a seventh modification, an incident surface on which the light from the light source 11 is incident and an exit surface from which the light propagated in the lightguide exits element may separately be provided in the lightguide element.

Figure 10:
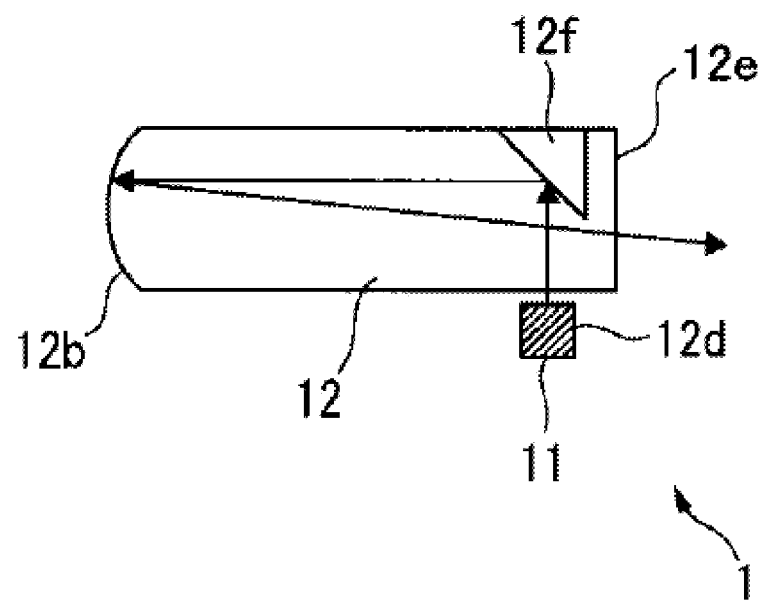
FIG. 10 is a schematic side views illustrating a light source device according to a seventh modification.

FIG. 10 is a schematic side views illustrating a light source device 1 of the seventh modification. In the seventh modification, an incident surface 12d is provided on the bottom surface side of the lightguide element 12, and an exit surface 12e is provided in a side surface on the opposite side to the reflecting surface 12b. Above the incident surface 12d, a prism 12f that reflects the light incident through the incident surface 12d toward the reflecting surface 12b is formed in the top surface of the lightguide element 12, namely, the surface on the opposite side to the incident surface 12d. The prism 12f is formed as a triangular groove extending along the width direction. In this case, preferably the prism 12f is provided at the focal position of the reflecting surface 12b in the width direction in order to collimate the exiting light in the width direction. The light source 11 is disposed below the incident surface 12d such that the emission surface of the light emitting element of the light source 11 faces the incident surface 12d. In the seventh modification, assuming that the position of the prism 12f corresponds to the position of the light source 11, the reflecting surface 12b may be formed such that the shape of the reflecting surface 12b is similar to that of the reflecting surface 12b in one of the embodiment and modifications in the thickness direction.

In the seventh modification, in the total of light incident through the incident surface 12d, only the light reflected by the prism 12f to travel toward the reflecting surface 12b is reflected by the reflecting surface 12b and exits from the exit surface 12e. Accordingly, the parallelism of the light exiting from the lightguide element 12 increases with decreasing size of the prism 12f. For this reason, the size of the prism 12f may properly be decided according to the light use efficiency and the parallelism of the exiting light, which are required for the light source device 1.

Figure 11A:
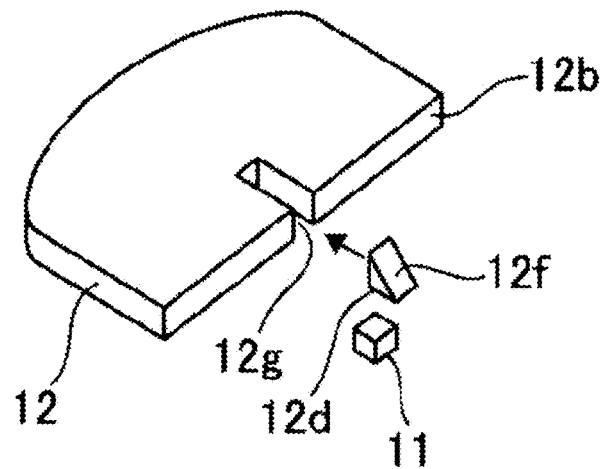
FIGS. 11A to 11C are exploded perspective views illustrating lightguide elements according to eighth, ninth, and tenth modifications.
Figure 11B:
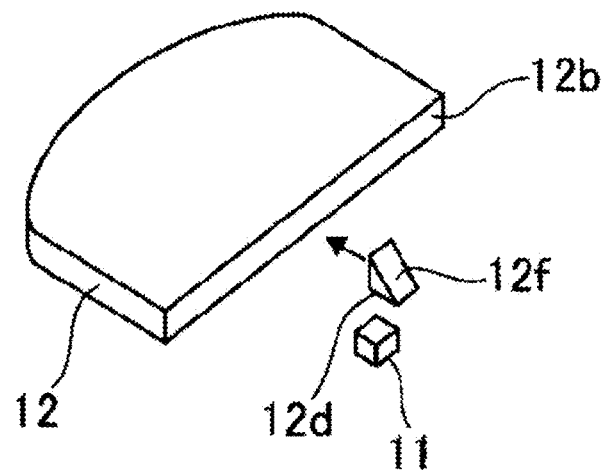
Figure 11C:
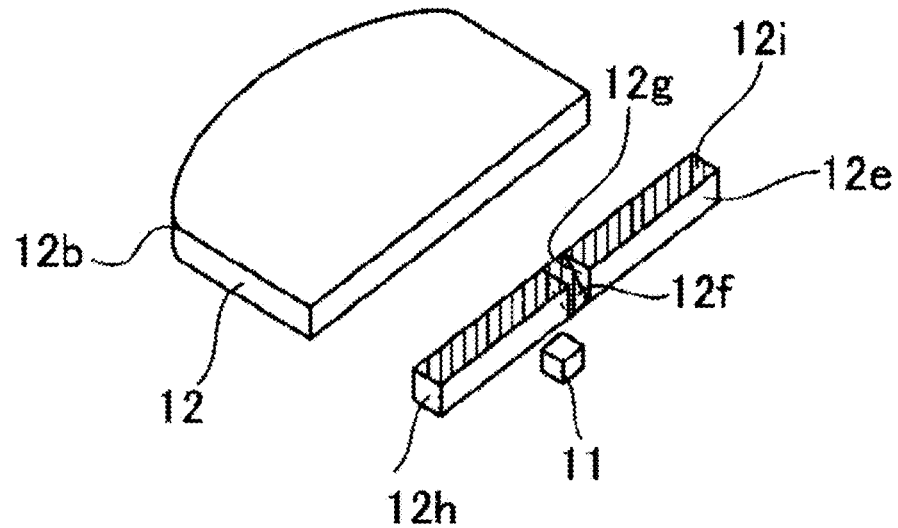

FIGS. 11A to 11C are exploded perspective views illustrating lightguide elements 12 in FIG. 10 according to eighth, ninth, and tenth modifications.

In the eighth modification of FIG. 11A, the prism 12f is formed independently of a main body of the lightguide element 12. In the main body of the lightguide element 12, a notch 12g is formed in the substantial center of the exit surface 12e in the width direction in order to attach the prism 12f. The prism 12f is attached to the notch 12g. The light source 11 is disposed so as to face the incident surface 12d provided in the bottom surface of the prism 12f.

In the ninth modification of FIG. 11B, the prism 12f is attached to the outside of the exit surface 12e of the main body of the lightguide element 12 in the vicinity of the center in the width direction. Also in this modification, the light source 11 is disposed opposite to the incident surface 12d provided in the bottom surface of the prism 12f. In the ninth modification of FIG. 11B, because the prism 12f projects from the main body of the lightguide element 12, in the total of light emitted from the light source 11, the light that is incident with no use of the prism 12f is prevented from being incident on the lightguide element 12. Therefore, the stray light can be suppressed in the modification of FIG. 11B.

In the tenth modification of FIG. 11C, the lightguide element 12 includes a lightguide member 12h used to attach the prism 12f together with the main body of the lightguide element 12. Similarly to the main body of the lightguide element 12, the lightguide member 12h is formed into a flat plate shape using a material transparent to the light from the light source 11. The lightguide member 12h has the same width and thickness as those of the lightguide element 12, and is attached to the side surface on the opposite side to the reflecting surface 12b. In this case, the surface on the opposite side to the surface facing the main body of the lightguide element 12 with respect to the lightguide member 12h constitutes the exit surface 12e. Similarly to the eighth modification of FIG. 11A, in the lightguide member 12h, the notch 12g is formed in the substantial center of the exit surface 12e in the width direction in order to attach the prism 12f. The prism 12f is attached to the notch 12g. The prism 12f may be formed integrally with the lightguide member 12h. The prism 12f reflects the light toward the main body of the lightguide element 12 from the light source 11 disposed opposite to the bottom surface of the prism 12f. In the tenth modification, preferably the prism 12f is provided at the focal position of the reflecting surface 12b in the width direction.

In the tenth modification of FIG. 11C, a retroreflection sheet 12i that retroreflects the light, which is incident upward from the bottom, toward the bottom may be formed on the top surface side of the lightguide member 12h, namely, in the surface on the opposite side to the surface facing the light source 11. In this case, the light, which is emitted from the light source 11 to be incident on the lightguide member 12h except for the prism 12f, is reflected downward by the retroreflection sheet 12i. Therefore, the stray light incident on the lightguide element 12 is suppressed. For example, a member including plural prisms or beads is used as the retroreflection sheet 12i.

Instead of the retroreflection sheet 12i, a metallic evaporated film or a multi-layered reflecting film, which constitutes a mirror, may be provided on the top surface of the lightguide member 12h. In this case, the metallic evaporated film or multi-layered reflecting film, which constitutes the mirror, may also be provided on the top surface of the prism 12f.

In an eleventh modification, the light may be guided from the light source 11 into the lightguide element 12 through a lightguide member 12j provided independently of the main body of the lightguide element 12.

Figure 12A:
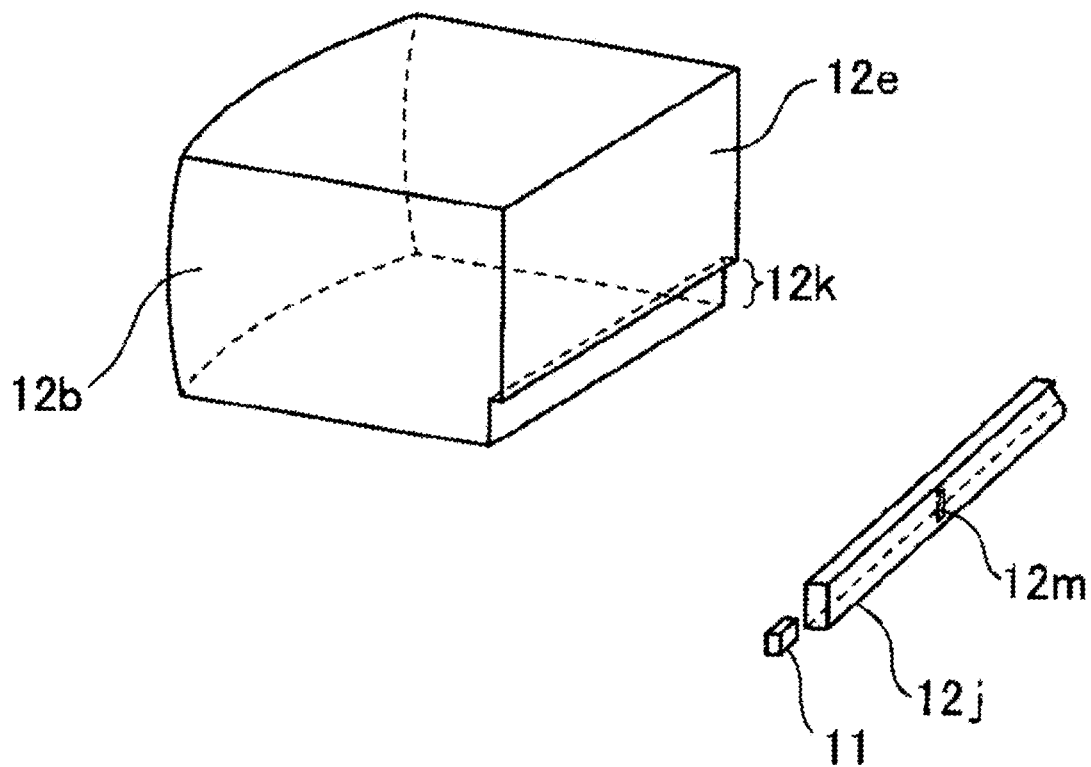
FIG. 12A is an exploded perspective view illustrating a light source device according to an eleventh modification.
Figure 12B:
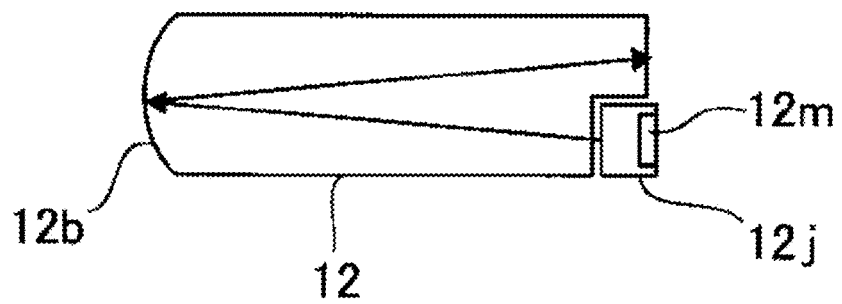
FIG. 12B is a schematic side view illustrating the light source device of the eleventh modification.

FIG. 12A is an exploded perspective view illustrating a light source device 1 according to the eleventh modification, and FIG. 12B is a schematic side view illustrating the light source device 1 of the eleventh modification. In the eleventh modification, in the main body of the lightguide element 12, a notch 12k is formed along the width direction in the vicinity of the lower end of the exit surface 12e. The lightguide member 12j is attached to the notch 12k in order to guide the light from the light source 11 to the main body of the lightguide element 12. The main body of the lightguide element 12 and the lightguide member 12j constitute the lightguide element.

The lightguide member 12j is formed into a rectangular solid shape using a material transparent to the light from the light source 11. The lightguide member 12j is disposed such that the exit surface that is one of side surfaces of the lightguide member 12j in the lengthwise direction faces a surface of the notch 12k of the main body of the lightguide element 12 in the thickness direction. In the width direction, a prism 12m is formed in the substantial center of the surface on the opposite side to the exit surface of the lightguide member 12j. The prism 12m reflects the light toward the side of the lightguide element 12. The light emitted from the light source 11, which is disposed so as to face one end face constituting the incident surface of the lightguide member 12j, is incident into the lightguide member 12j through the end face. Therefore, the prism 12m is formed as a triangular groove extending along the thickness direction. The light reflected by the prism 12m is incident into the main body of the lightguide element 12 through the exit surface of the lightguide member 12j and the notch 12k of the lightguide element 12. Also in the eleventh modification, preferably the prism 12m is provided at a focal position of the reflecting surface 12b in the width direction.

Also in the eleventh modification, in the total of light incident on the lightguide member 12j, only the light reflected by the prism 12m to travel toward the reflecting surface 12b is reflected by the reflecting surface 12b and exits from the exit surface 12e. Accordingly, the parallelism of the light exiting from the lightguide element 12 increases with decreasing size of the prism 12m. For this reason, the size of the prism 12m may properly be decided according to the light use efficiency and the parallelism of the exiting light, which are required for the light source device 1.

Plural light source devices of one of the above embodiment and modifications may be arrayed in the width direction. Therefore, the width of the supplied light can be increased. Particularly, when the plural light source devices in FIGS. 12A and 12B are arrayed in the width direction, the light source and the lightguide member may be configured to be shared by the lightguide elements.

Figure 13A:
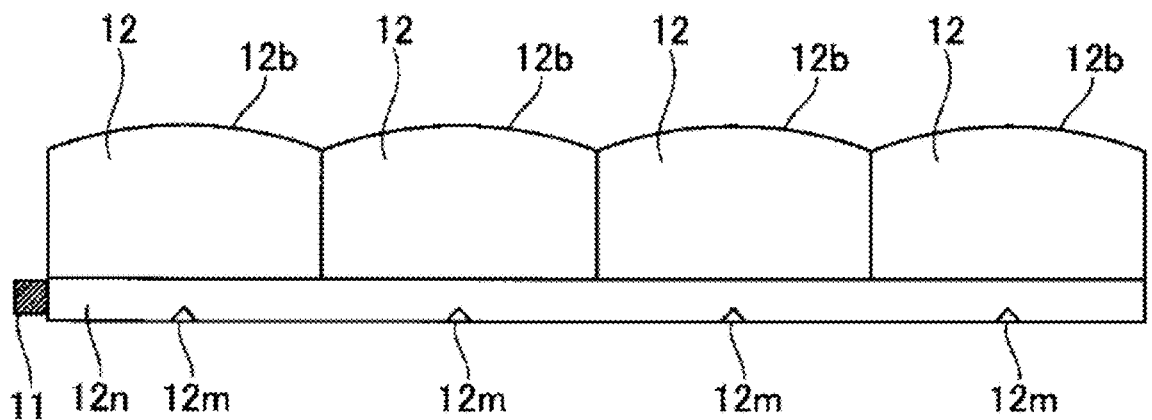
FIG. 13A is a schematic bottom view illustrating a light source device according to a twelfth modification.
Figure 13B:
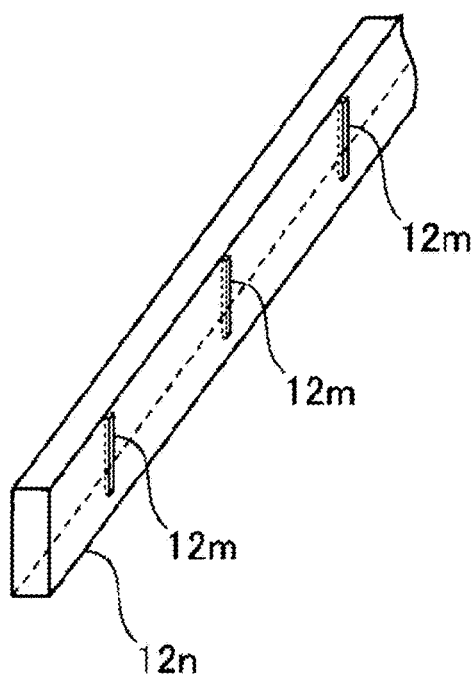
FIG. 13B is a schematic perspective view illustrating a lightguide member shared by each lightguide element.

FIG. 13A is a schematic bottom view illustrating a light source device according to a twelfth modification. FIG. 13B is a schematic perspective view illustrating a lightguide member commonly used in each lightguide element.

As illustrated in FIG. 13A, in the twelfth modification, the plural lightguide elements 12 are arrayed in the width direction. The lightguide element in FIG. 12A may be used as each lightguide element 12 in FIG. 13A. The lightguide elements 12 may integrally be formed, or the lightguide elements 12 may be bonded together using an adhesive agent after separately formed. A rectangular lightguide member 12n is attached to a notch of each lightguide element 12.

In the lightguide member 12n, similarly to the lightguide member 12j in FIG. 12B, one end face is formed as the incident surface. The light source 11 is disposed such that the emission surface of the light emitting element of the light source 11 faces the incident surface. The light emitted from the light source 11 is incident into the lightguide member 12n through the incident surface, and is propagated while totally reflected in the lightguide member 12n. In the surface of the lightguide member 12n on the opposite side to the surface facing the lightguide element 12 in the thickness direction, the prism 12m is formed in the lightguide member 12n for each lightguide element 12 in order to guide the light from the light source 11 to the lightguide element 12. Each prism 12m is formed as a substantially triangular groove extending in the thickness direction, and is provided at the focal position of the reflecting surface 12b of the corresponding lightguide element 12 in the width direction.

Therefore, the light is supplied from the light source 11 to the plural lightguide elements 12 using one light source 11 and one lightguide member 12n.

The end face on the opposite side to the incident surface of the lightguide member 12n may be formed as the reflecting surface. To this end, a metallic evaporated film or a multi-layered reflecting film may be provided on the end face on the opposite side to the incident surface. Each prism 12m may be formed as a substantially isosceles triangular groove such that the light, which is reflected by the reflecting surface to travel onto the incident surface side of the lightguide member 12n, can also be guided to the lightguide element 12.

Figure 13C:
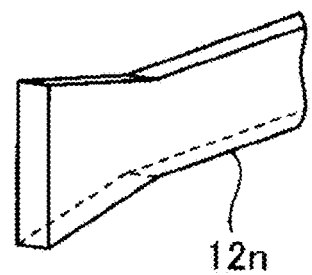
FIG. 13C is a schematic perspective view illustrating a vicinity of an incident surface of the lightguide member.

As illustrated in FIG. 13C, the lightguide member 12n may be tapered in the vicinity of the incident surface of the lightguide member 12n such that the length in the thickness direction increases toward the incident surface. Therefore, the amount of light, which is emitted from the light source 11 and propagated in the lightguide member 12n, increases.

Figure 14A:
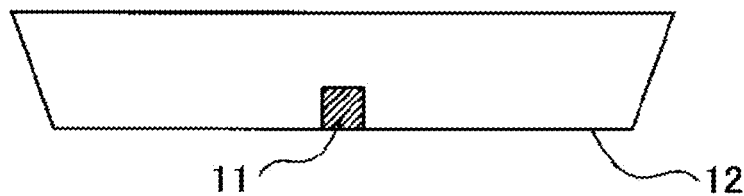
FIGS. 14A and 14B are schematic front views illustrating lightguide elements according to thirteenth and fourteenth modifications.
Figure 14B:
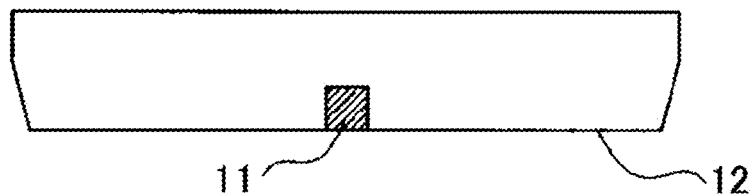
Figure 14C:
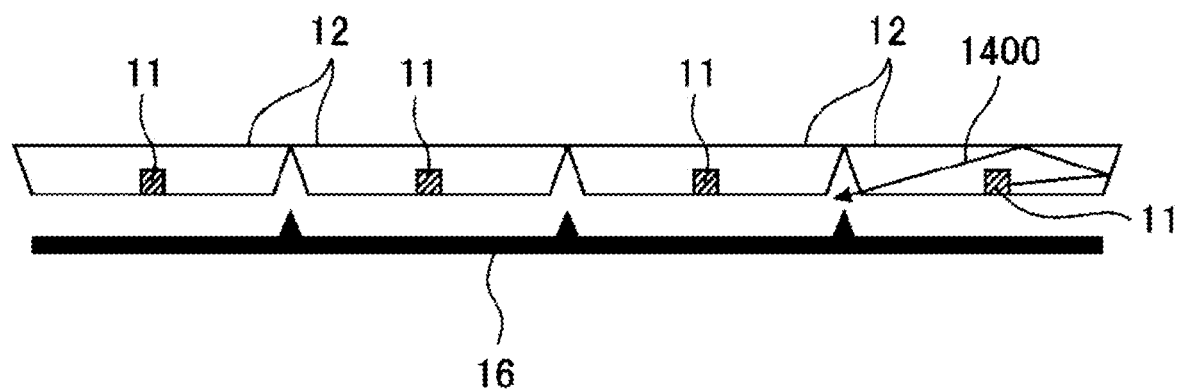
FIG. 14C is a schematic front view illustrating a light source device in which plural lightguide elements of the thirteenth or fourteenth modification are arrayed.

In this case, as illustrated in FIG. 14A or 14B, both the side surfaces of the individual lightguide element 12 may be tapered such that the width of the lightguide element 12 increases upward, namely, with increasing distance from the incident position of the light from the light source 11 in the thickness direction. In a thirteenth embodiment of FIG. 14A, the lightguide element 12 is tapered from the lower end to the upper end. In a fourteenth embodiment of FIG. 14B, both side surfaces of the lightguide element 12 are tapered below a predetermined position between the lower end and the upper end of the lightguide element 12. Compared with the lightguide element 12 of the thirteenth embodiment in FIG. 14A, in the lightguide element 12 of the fourteenth embodiment of FIG. 14B, luminance degradation of the exiting light is suppressed in the vicinity of a boundary between the lightguide elements 12 when the plural lightguide elements 12 are arrayed in the width direction as illustrated in FIG. 14C. Resultantly, the luminance unevenness of the exiting light is suppressed in the width direction.

When the lightguide element 12 is formed as described above, in the total of light emitted from the light source 11 to be incident to the lightguide element 12, the light reflected by the side surface once is reflected by the top surface of the lightguide element 12, and easily gathers together in the lower portion of the side surface on the opposite side. As illustrated in FIG. 14C, the light source device may further include a support member 16 to support each lightguide element 12. The support member 16 made of a light absorbing material has a projection that is formed so as to be fitted between the tapers of the lightguide elements 12 arrayed in the width direction. As indicated by an arrow 1400, the stray light reaching the side surface is prevented from leaking to the outside, and therefore the parallelism of the exiting light is further improved in the width direction.

In a fifteenth modification, the light source 11 may be disposed such that the light from the light source 11 is obliquely incident on the lightguide element 12 in the width direction.

Figure 15:
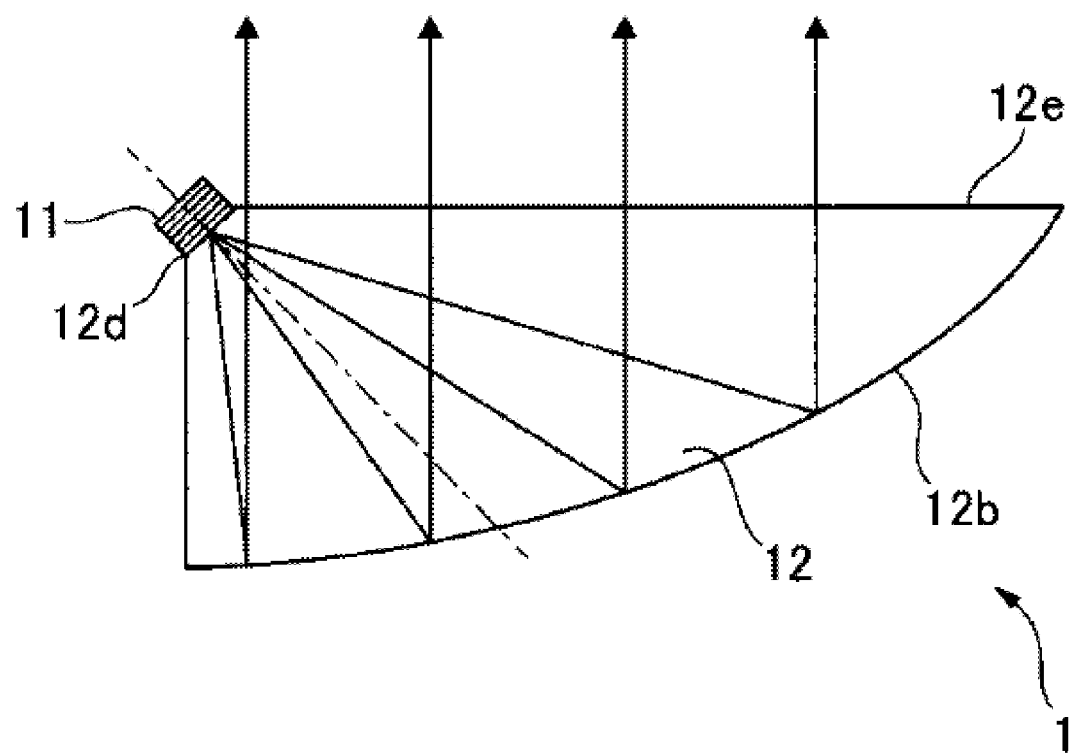
FIG. 15 is a schematic plan view illustrating a light source device according to a fifteenth modification.

FIG. 15 is a schematic plan view illustrating a light source device 1 of the fifteenth modification. In the fifteenth modification, one end of the exit surface 12e of the lightguide element 12 is obliquely cut to constitute the incident surface 12d. The light source 11 is disposed such that the emission surface of the light emitting element of the light source 11 faces the incident surface 12d. That is, the light source 11 is disposed oblique to the depth direction. In this case, for example, the reflecting surface 12b is formed into a parabolic shape in which one end on the side on which the incident surface 12d is formed becomes the vertex in the width direction. In the fifteenth modification, preferably the light source 11 is disposed so as to be substantially matched with the focal point of the reflecting surface 12b in the width direction. The reflecting surface 12b may be formed into an elliptic shape, a circular shape, a parabolic shape, or a corner cube shape in the thickness direction.

In the fifteenth modification, the light reflected by the reflecting surface 12b is not blocked by the light source 11. Additionally, a whole portion in which the incident surface 12d is removed from the end face on the opposite side to the reflecting surface 12b can be used as the exit surface 12e. Therefore, in the light source device 1, the substantially whole light incident on the lightguide element 12 from the light source 11 can be used as the exiting light.

Figure 16A:
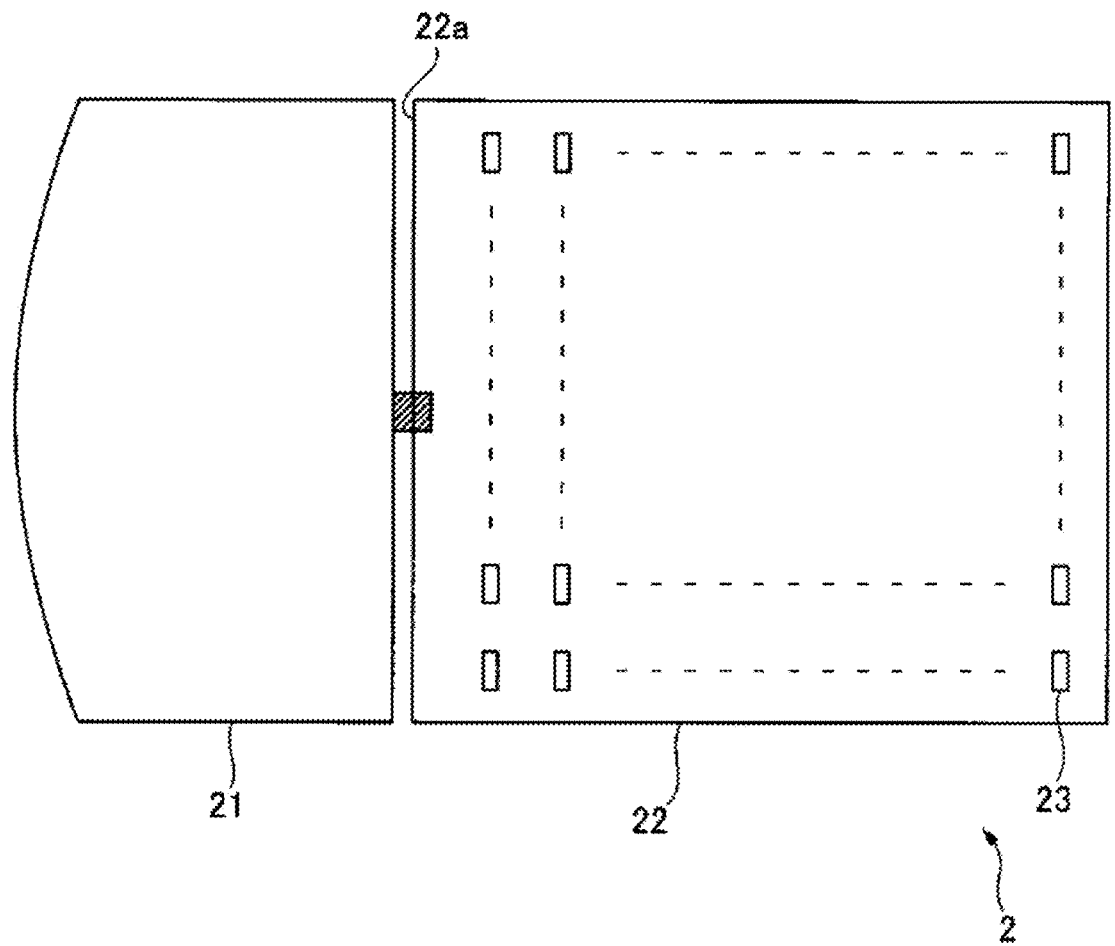
FIG. 16A is a schematic plan view of a surface illumination device in which the light source device of one of the embodiment and modifications is used.
Figure 16B:
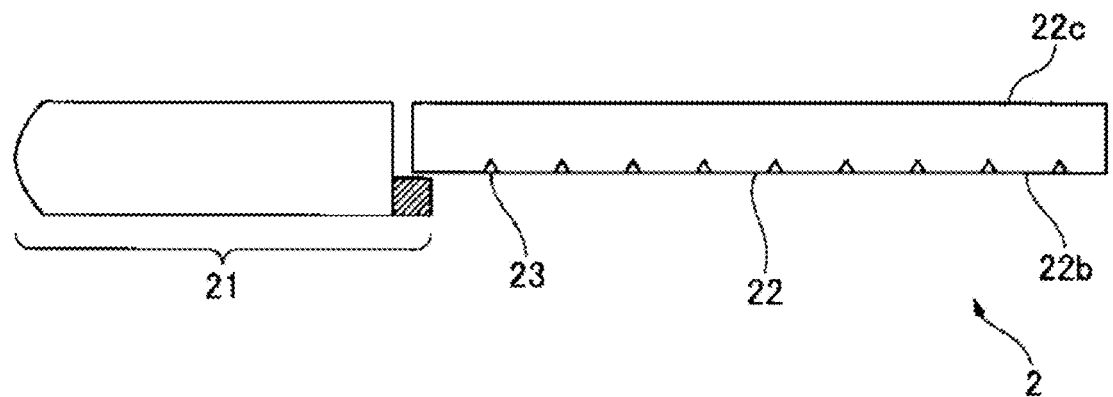
FIG. 16B is a schematic side view illustrating the surface illumination device.

FIG. 16A is a schematic plan view of a surface illumination device in which one of the light source devices of the embodiment and modifications is used, and FIG. 16B is a schematic side view illustrating the surface illumination device. A surface illumination device 2 includes a light source device 21 and a lightguide plate 22. In the surface illumination device 2, the light exiting from the light source device 21 is propagated in the lightguide plate 22, reflected by the diffusion surface that is one of the surfaces of the lightguide plate 22, and caused to exit from the surface on the opposite side to the diffusion surface, whereby surface illumination is performed such that the light exits from the whole exit surface of the lightguide plate 22.

The light source device 21 is the light source device of one of the above embodiment and modifications. The light source device 21 causes the light emitted from the light source to exit from the incident and exiting surface or the exit surface while the light is collimated in the width direction using the lightguide element.

The lightguide plate 22 is formed into a flat member by molding resin, such as polymethylmethacrylate (PMMA), polycarbonate, and cycloolefin polymer, which is transparent to the light emitted from the light source of the light source device 21.

One of sidewalls of the lightguide plate 22 is formed as an incident surface 22a. The light source device 21 and the lightguide plate 22 are disposed such that the incident surface 22a faces the incident and exiting surface or exit surface of the light source device 21. Therefore, the light exiting from the light source device 21 is incident on the lightguide plate 22 through the incident surface 22a.

In a diffusion surface 22b that is one of the surfaces of the lightguide plate 22, the plural prisms 23 are disposed into a lattice shape with a predetermined pitch. The plural prisms 23 may be disposed in a zigzag manner with a predetermined pitch. For example, in the diffusion surface 22b, each prism 23 is formed as the substantially triangular groove extending in the width direction. Each prism 23 reflects the light incident on the incident surface 22a from the light source device 21, and causes the reflected light to exit substantially perpendicularly to an exit surface 22c that is the surface on the opposite side to the diffusion surface 22b. Therefore, the surface illumination device 2 causes the light to exit from the whole diffusion surface 22b of the lightguide plate 22, so that the surface illumination can be performed with the diffusion surface 22b as the emission surface.

As described above, those skilled in the art can make various modifications according to the embodiment without departing from the scope of the present invention.

The invention claimed is:

1. A light source device comprising:
a light source configured to emit illumination light; and
a lightguide element formed into a flat plate shape using a transparent material, wherein
the lightguide element comprises:
an incident surface facing the light source, the incident surface being formed so as to cause the illumination light to be incident into the lightguide element;
a reflecting surface formed in one of side surfaces of the lightguide element to reflect the illumination light incident into the lightguide element; and
an exit surface formed in a side surface of the lightguide element on an opposite side to the reflecting surface, the illumination light reflected by the reflecting surface exiting from the exit surface, and
the reflecting surface is formed into a curved surface that is curved in each of a width direction and a thickness direction of the lightguide element and is curved such that an optical path length of the illumination light from the incident surface to the exit surface is constant along the reflecting surface, the curved surface collimating the illumination light reflected by the reflecting surface in a surface comprising a lengthwise direction of the reflecting surface, and the reflecting surface is formed into a concave mirror in each of a short direction of the reflecting surface and the lengthwise direction of the reflecting surface.

2. The light source device according to claim 1, wherein the incident surface and the exit surface are integrally formed,
the reflecting surface is formed into an elliptic shape along the short direction of the reflecting surface, and
the light source is disposed at one of focal points in the short direction of the reflecting surface.

3. The light source device according to claim 2, further comprising a mask plate disposed between the incident surface and the light source, the mask plate made of an opaque material being shorter than the lightguide element in the short direction, wherein the mask plate comprises a slit extending in the short direction at a position facing the light source.

4. The light source device according to claim 1, wherein the reflecting surface is formed into a parabolic shape along the short direction of the reflecting surface, and is formed such that a vertex of the reflecting surface in the short direction deviates from a center of the lightguide element in the short direction, the incident surface and the exit surface are integrally formed, and a distance from the vertex of the reflecting surface to the incident surface becomes a focal distance of the reflecting surface in the short direction, and the light source is disposed at a position deviating from the center of the lightguide element onto an opposite side to the vertex in the short direction.

5. The light source device according to claim 1, wherein the incident surface is formed at a position closer to the exit surface than the reflecting surface in a depth direction from the reflecting surface toward the exit surface in a first surface formed in lengthwise directions of the reflecting surface and the exit surface, and the lightguide element further comprises a prism formed opposite to the incident surface in a second surface to reflect the illumination light incident into the lightguide element through the incident surface toward the reflecting surface.

6. The light source device according to claim 5, wherein the prism is formed at a focal point of the reflecting surface in the lengthwise direction.

7. The light source device according to claim 5, wherein the lightguide element further comprises a retroreflection sheet configured to retroreflect the illumination light incident from the first surface in which the incident surface is provided, the retroreflection sheet being provided on both sides of the prism in the lengthwise direction in the second surface.

8. The light source device according to claim 1, wherein the lightguide element is formed into a wedge shape in which a length in the short direction increases toward the reflecting surface.

9. The light source device according to claim 1, wherein the lightguide element comprises:

a notch formed in the lengthwise direction on one side of the exit surface in the short direction; and a rectangular solid lightguide member attached to the notch, and one of end faces of the lightguide member in the lengthwise direction is formed as the incident surface, and a prism is formed in a surface on an opposite side to a surface facing the notch of the lightguide member, the prism reflecting the illumination light incident into the lightguide member through the incident surface toward the reflecting surface.

10. A surface illumination device comprising:

a light source device configured to emit illumination light; and a lightguide plate configured to cause the illumination light incident into the lightguide plate to exit from one of surfaces, the lightguide plate being formed into a flat plate shape using a transparent material, wherein the light source device comprises:

a light source configured to emit the illumination light; and a lightguide element formed into a flat plate shape using a transparent material, the lightguide element comprises:

an incident surface facing the light source, the incident surface being formed so as to cause the illumination light to be incident into the lightguide element;

a reflecting surface formed in one of side surfaces of the lightguide element to reflect the illumination light incident into the lightguide element; and an exit surface formed in a side surface of the lightguide element on an opposite side to the reflecting surface, the illumination light reflected by the reflecting surface exiting from the exit surface, the reflecting surface is formed into a curved surface that is curved in each of a width direction and a thickness direction of the lightguide element and is curved such that an optical path length of the illumination light from the incident surface to the exit surface is constant along the reflecting surface, the curved surface collimating the illumination light reflected by the reflecting surface in a surface comprising a lengthwise direction of the reflecting surface, and the reflecting surface is formed into a concave mirror in each of a short direction of the reflecting surface and the lengthwise direction of the reflecting surface, and the lightguide plate comprises:

a lightguide plate incident surface disposed opposite to the exit surface of the lightguide element; and a plurality of prisms formed in a second surface of the lightguide plate to reflect the illumination light propagated in the lightguide plate toward a first surface.

11. A lightguide element formed into a flat plate shape using a transparent material, the lightguide element comprising:

an incident surface facing a light source configured to emit illumination light, the incident surface being formed so as to cause the illumination light to be incident into the lightguide element;

a reflecting surface formed in one of side surfaces of the lightguide element to reflect the illumination light incident into the lightguide element; and an exit surface formed in a side surface of the lightguide element on an opposite side to the reflecting surface, the illumination light reflected by the reflecting surface exiting from the exit surface, wherein the reflecting surface is formed into a curved surface that is curved in each of a width direction and a thickness direction of the lightguide element and is curved such that an optical path length of the illumination light from the incident surface to the exit surface is constant along the reflecting surface, the curved surface collimating the illumination light reflected by the reflecting surface in a surface comprising a lengthwise direction of the reflecting surface, and the reflecting surface is formed into a concave mirror in each of a short direction of the reflecting surface and the lengthwise direction of the reflecting surface.

* * * * *